(12) United States Patent
Lim

(10) Patent No.: US 6,738,122 B2
(45) Date of Patent: May 18, 2004

(54) PORTABLE INFORMATION TERMINAL HAVING GATE AND DATA PADS ARRANGED AT SAME EDGE OF LIQUID CRYSTAL DISPLAY

(75) Inventor: Joo Soo Lim, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/143,898

(22) Filed: May 14, 2002

(65) Prior Publication Data

US 2002/0176044 A1 Nov. 28, 2002

(30) Foreign Application Priority Data

May 23, 2001 (KR) .......................... 2001-28521

(51) Int. Cl.[7] .................. G02F 1/1345; H01R 12/00; H05K 1/00
(52) U.S. Cl. ........................... 349/149; 439/67
(58) Field of Search ............ 439/67; 361/749; 1174/117 FF

(56) References Cited

U.S. PATENT DOCUMENTS

| | | | | |
|---|---|---|---|---|
| 5,748,267 A | * | 5/1998 | Natori et al. | 349/40 |
| 6,100,949 A | * | 8/2000 | Kim | 349/40 |
| 6,151,091 A | * | 11/2000 | Muramatsu | 349/149 |
| 6,319,019 B1 | * | 11/2001 | Kwon et al. | 439/67 |
| 2001/0022639 A1 | * | 9/2001 | Kwak et al. | 349/122 |
| 2003/0117563 A1 | * | 6/2003 | Lim | 349/149 |

* cited by examiner

*Primary Examiner*—Chandrika Prasad
(74) *Attorney, Agent, or Firm*—McKenna Long & Aldridge LLP

(57) ABSTRACT

A portable information terminal with a liquid crystal display processed by a simplified fabrication method is adaptive to portable information devices. A portable information terminal using an LCD includes a gate pads connected to gate lines of a liquid crystal panel wherein the gate pads are formed at the edge of the liquid crystal panel; and data pads connected to data lines of the liquid crystal panel wherein each data pad is formed on the liquid crystal panel adjacent to the gate pad.

19 Claims, 7 Drawing Sheets

PORTABLE INFORMATION TERMINAL HAVING GATE AND DATA PADS ARRANGED AT SAME EDGE OF LIQUID CRYSTAL DISPLAY

This application claims the benefit of Korean Application No. P2001-28521, filed on May 23, 2001, which is hereby incorporated by reference for all purposes as if fully set forth herein.

BACKGROUND OF THE INVENTION

1. Field of the Invention

The present invention relates to a portable information terminal having a liquid crystal display, and more particularly to a portable information terminal having a liquid crystal display fabricated according to a simplified module process and that is adaptive to small information devices.

2. Description of the Related Art

The mobile communications industry has witnessed a rapid expansion in the use of mobile communication terminals such as mobile phones, personal communication systems (PCS), etc. The study of hand-handled personal computer (HPC) or portable digital apparatus (PDA) with increased functionality compared to previous mobile communication terminals is also being actively pursued. Due to the development of information transmission techniques, motion picture information (e.g., IMT-2000) may be used to view moving images in real time.

A small portable information terminal uses a liquid crystal display LCD module as means of displaying a picture.

Referring to FIGS. 1 and 2, conventional LCD modules include a liquid crystal panel 11, a gate driving printed circuit board (PCB) 26, a data driving PCB 28, a gate tape carrier package (TCP) 18 and a data TCP 20 installed between the liquid crystal panel 11 and the gate and data driving PCBs 26 and 28, respectively, a gate pad 14 connecting the gate TCP 18 to gate lines GL, a data pad 16 connecting the data TCP 20 to data lines DL, gate driving integrated circuit ICs 22 and data driving IC's 24 mounted on the TCP's, and a connector 32 and a flexible printed circuit (FPC) film 30 for input/output wiring that connect a main board 34 to the gate and data driving PCB 26 and 28.

In the liquid crystal panel 11, liquid crystal cells are arranged in a matrix pattern at a pixel area between the crossing of the gate lines GL and the data lines DL (FIG. 2). A lower substrate 12 and an upper substrate 10 are joined together, and then liquid crystal is injected between the upper and lower substrates 10 and 12, respectively, to complete the liquid crystal panel 11. A plurality of gate pads 14 are formed at the edge of one side of the lower substrate 12 of the liquid crystal panel 11, and a plurality of data pads 16 are formed at the edge of a lower end of the lower substrate 12 of the liquid crystal panel 11. The gate pad 14 supplies gate signals from the gate driving ICs 22 to the gate lines GL. The data pad 16 supplies data signals from the data driving ICs 24 to the data lines DL. The gate pad 14 and the data pad 16 are bonded to the gate and data TCPs 18 and 20 by an anisotropic conductive film (ACF).

Input/output pads of the gate and data TCPs 18 and 20 are formed in input/output portions of the polyimide base film such that the gate and data driving ICs 22 and 24 may be mounted on the polyimide base film. Accordingly, the output portions of the gate and data TCPs 18 and 20 are joined to the gate and the data pads 14 and 16 and the input portions of the gate and data TCP's 18 and 20 are joined to gate and a data driving PCBs 26 and 28.

The gate driving ICs 22 respond to control signals from a timing controller (not shown) mounted on the gate driving PCB 26 and sequentially supply scanning signals (i.e., gate pulses) to the gate lines GL. The data driving ICs 24 supply red, green, and blue (RGB) data received from the data driving PCB 28 to the data lines DL.

The main board 34 includes a microprocessor, a graphic processing circuit, etc., and supplies video signals and control signals to the data driving PCB 28. The data driving PCB 28 is connected to the gate driving PCB 26 via the FPC film 29.

The FPC film 30 accommodates input/output wiring and includes signal wires to provide a signal transmission path between the LCD module and the main board 34. The connector 32 is installed at the end of the FPC film 30 and connects the FPC film 30 to a jack of the main board 34.

In accordance with the tendency of the miniaturization of the above described portable information terminal, LCD size continues to decrease. However, because gate and data driving ICs of the LCDs are located at the left and at the bottom end, respectively, of the liquid crystal panel, the relative size of the driving ICs and their corresponding structures (e.g., PCB, TCP, etc.) increases. Also, due to the installation of each PCB and TCP at the side and the bottom of the liquid crystal panel, the process of bonding each gate and data TCP becomes more difficult and the number of LCD fabricating processes as well as the number of parts increase. Accordingly, it becomes difficult to make a portable information terminal small in size, light in weight, and thin in thickness.

SUMMARY OF THE INVENTION

Accordingly, the present invention provides a portable information terminal having a liquid crystal display fabricated according to a simplified module process and that is adaptive to a small information devices that substantially obviates one or more of the problems due to limitations and disadvantages of the related art.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

In order to achieve these and other advantages of the invention, a portable information terminal using an LCD according to an embodiment of the present invention includes a gate pad connected to a plurality of gate lines in a liquid crystal panel and formed at the edge of the liquid crystal panel; and a data pad connected to a plurality of data lines of the liquid crystal panel and formed in the liquid crystal panel parallel to the gate pad.

The portable information terminal further includes a gate driving circuit for supplying scanning signals to the gate lines to drive the gate lines; a data driving circuit for supplying video data to the data lines to drive the data lines; and a flexible printed circuit film on which the gate driving circuit and the data driving circuit are both mounted and to which the gate pad and the data pad are connected.

In the portable information terminal of the present invention, a timing controller is mounted on the flexible printed circuit film supplies data and timing control signals required at the gate driving circuit and the data driving circuit.

The portable information terminal further includes a main board where circuits are mounted for supplying control signals and data to the flexible printed circuit film; and a connector installed at the end of the flexible printed circuit film and connected to a jack of the main board.

In the portable information, the gate pad and the data pad have substantially the same pitch and may be formed at either the bottom or side end of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Reference will now be made in detail to embodiments of the present invention, examples of which are illustrated in the accompanying drawings.

Figure 3:
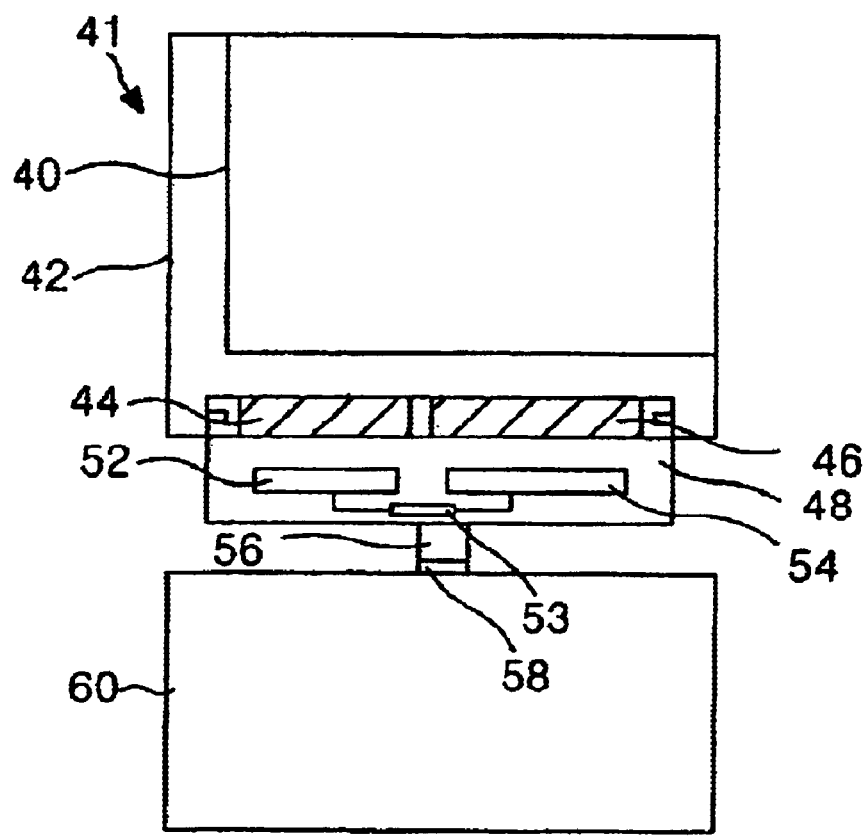
FIG. 3 illustrates an LCD module according to a first embodiment of the present invention.

FIG. 3 illustrates an LCD module of a portable information terminal according to a first embodiment of the present invention.

Referring to FIG. 3, an LCD module according to the present invention includes a liquid crystal panel 41, a group of gate pads 44 and a group of data pads 46 formed adjacent to each other at the bottom end of the liquid crystal panel 41, gate and data driving ICs 52 and 54, respectively, are mounted on a driving FPC film 48, an FPC film 56 accommodating input/output wiring connects the driving FPC film 48 and a main board 60.

In the liquid crystal panel 41, gate lines GL and data lines DL cross each other and liquid crystal cells are arranged in a matrix pattern at a pixel area between the crossing of the gate lines GL and data lines DL. Lower substrate 42 and upper substrate 40 are joined together, followed by an injection of liquid crystal between the upper and lower substrates to complete fabrication of the liquid crystal panel 41.

Figure 4:
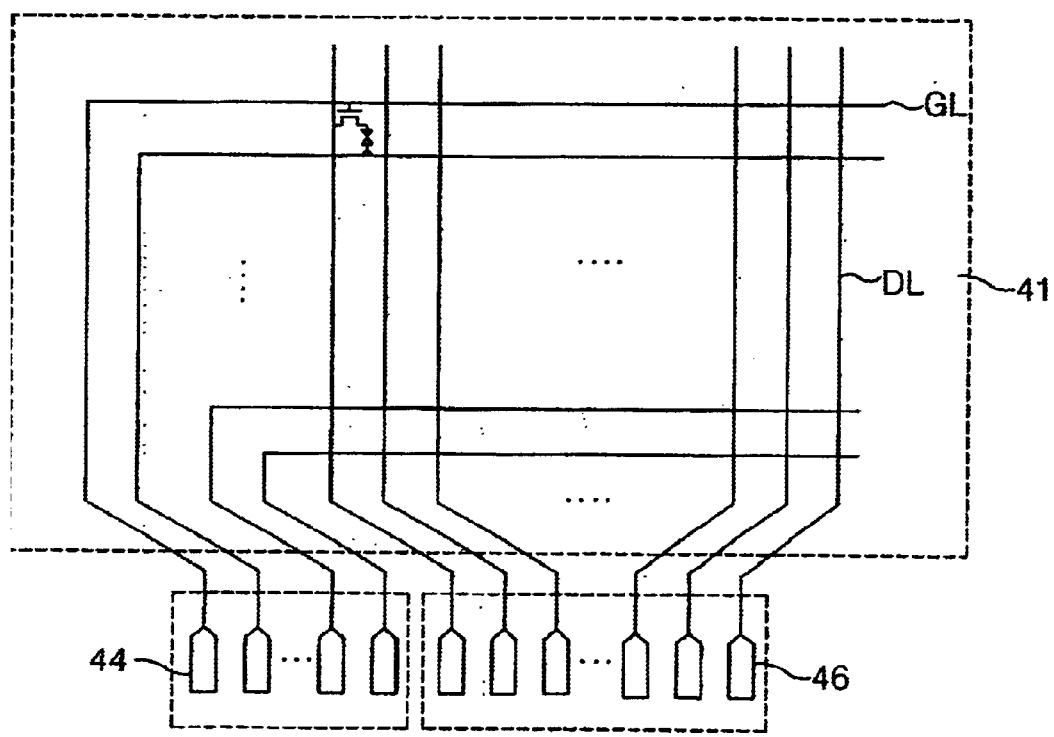
FIG. 4 illustrates a wiring arrangement connected to an electrode pad of the LCD illustrated in FIG. 3.

As illustrated in FIG. 4, the gate pads 44 and the data pads 46 are both formed at the edge of the bottom end of the liquid crystal panel 41 as two groups of pads having an equal pitch. Each pad within the group of the gate pads 44 is located at the bottom left of the liquid crystal panel 41 and is connected to a single gate line GL as shown in FIG. 4. The gate pads 44, gate lines GL, and gate electrodes of a TFT (not shown) are formed by depositing a single metal layer on the lower substrate and performing a single photo etching patterning procedure.

The group of data pads 46 is adjacent the group of gate pads 44, is located at the bottom right of the liquid crystal panel 41, and each pad within the group of data pads 46 is connected to a single data line DL as shown in FIG. 4.

The data pads 46, data lines DL, and source/drain electrodes of the TFT (not shown) are formed by depositing a single metal layer on the lower substrate and performing a single photo etching patterning, as shown in FIG. 4.

Referring back to FIG. 3, output pads of the driving FPC film 48 are connected to the gate pads 44 and data pads 46 by an anisotropic conductive film (ACF). Gate and data driving ICs 52 and 54, respectively, may be mounted on the driving FPC film 48 using a chip on film (COF) method.

The gate driving ICs 52 sequentially generate scanning signals (i.e., gate signals). The scanning signals are supplied to the gate lines GL via the output pad of the driving FPC film 48 and the gate pads 44. Accordingly, the liquid crystal panel may be sequentially scanned by one line at a time.

The data driving ICs 54 supply video data to the data lines DL one line at a time. Liquid crystal pixel cells connected to the lines being scanned are charged with this video data.

A timing controller 53 may be mounted on the driving FPC film 48 for controlling the gate and data driving ICs 52 and 54, respectively. The timing controller supplies gate start pulses to each of the gate driving ICs 52 using a shift register (not shown) and simultaneously supplies red, green, and blue (RGB) data together with dot clocks to the data driving ICs 54.

The FPC film 56 accommodates input/output wiring and includes wirings through which signals may be transmitted thereby providing a signal transmission path between a main board 60 and the driving FPC film 48. A connector 58 may be installed at the end of the FPC film 58 and connect to a jack of the main board 60.

The main board 60 includes a microprocessor, a graphic processing circuit, etc., and supplies video signals and control signals to the driving FPC film 48 via the FPC film 56.

Figure 1:
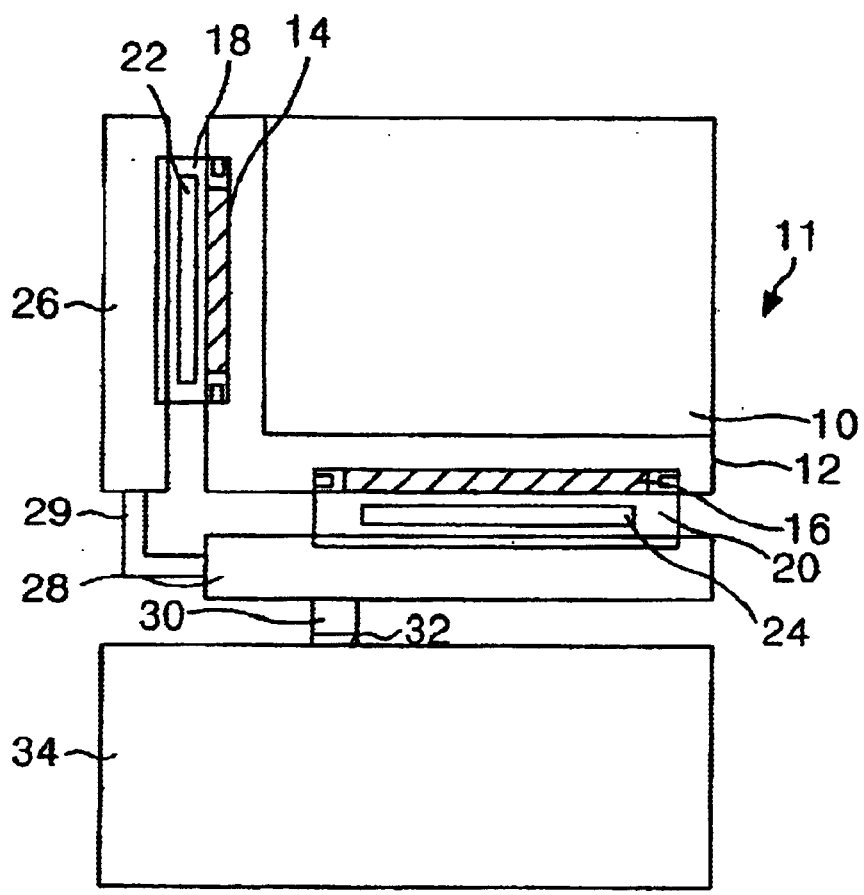
FIG. 1 illustrates an LCD module of a conventional portable information terminal.
Figure 2:
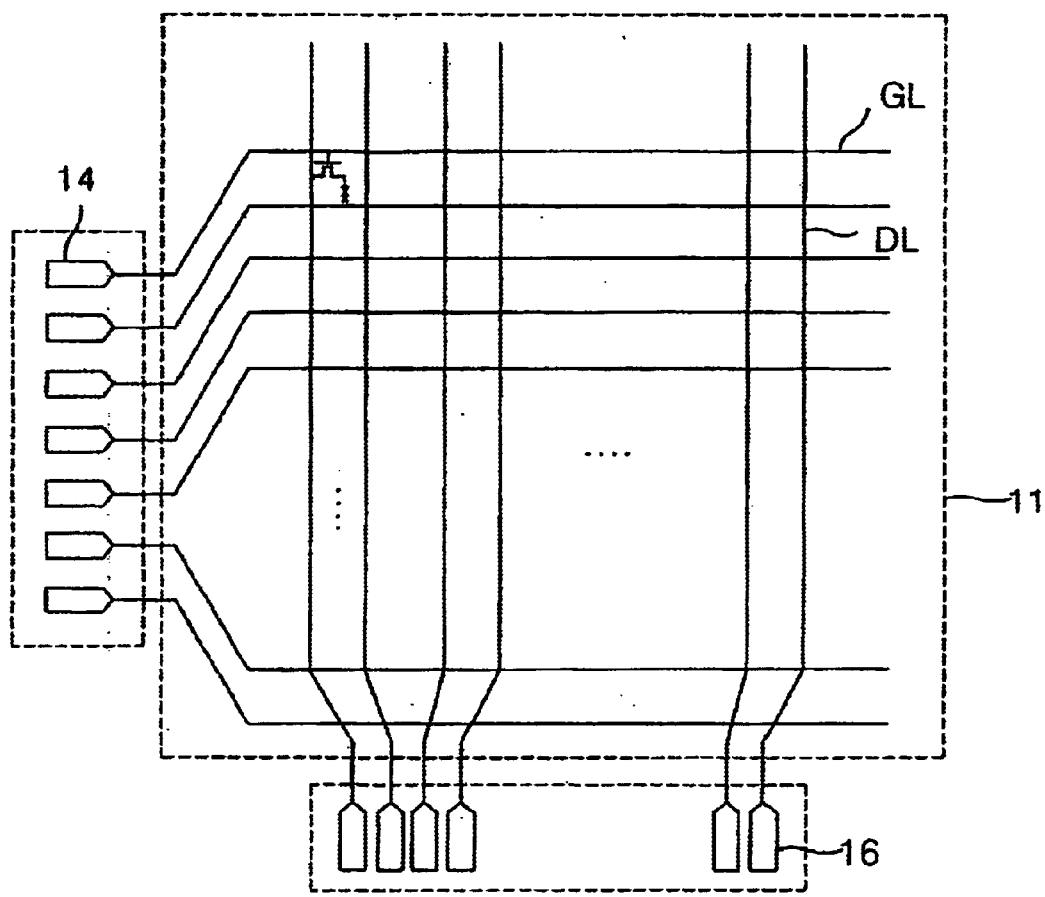
FIG. 2 illustrates a wiring arrangement connected to an electrode pad of the LCD illustrated in FIG. 1.

The gate and data pads 44 and 46, respectively, form two groups of adjacent pads connected to the driving FPC film 48 by a one time adhesion process. Thus, the number of TCPs (i.e., the number of FPC films used and the adhesion processes performed) are reduced in comparison with conventional LCD modules as illustrated in FIG. 1.

Figure 5:
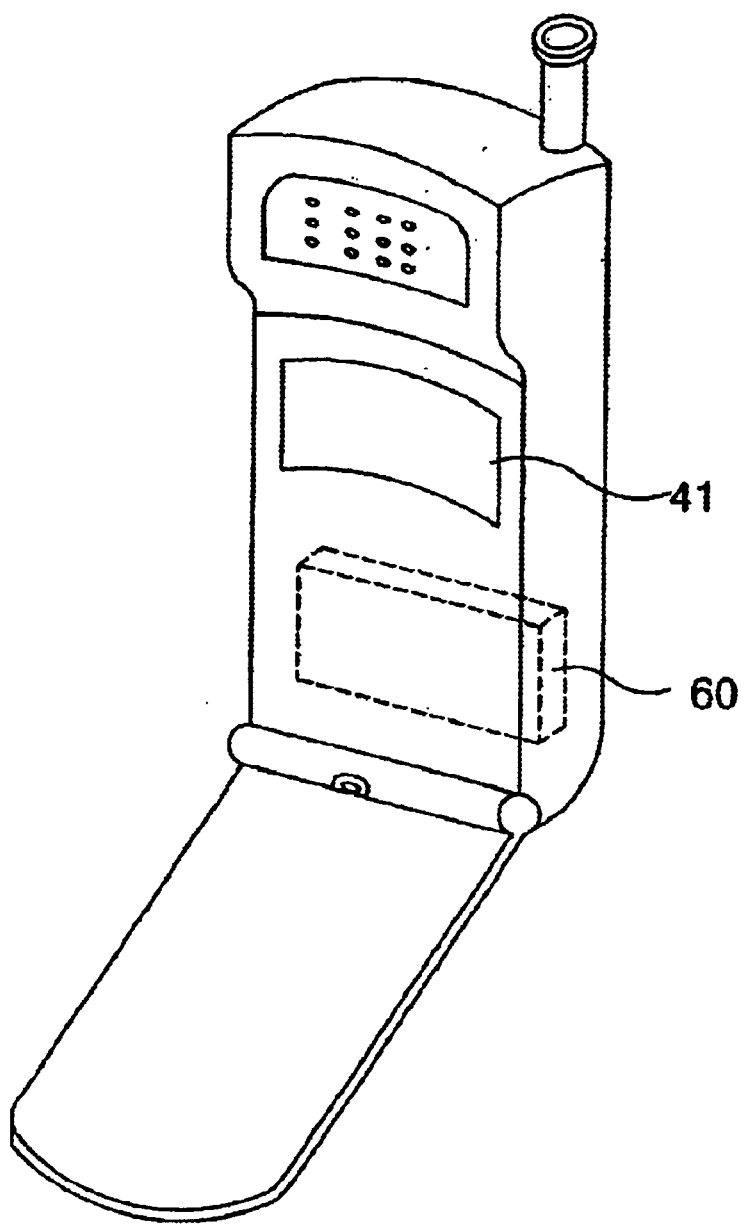
FIG. 5 illustrates a perspective view of a flip type portable information terminal where the LCD module shown in FIG. 3 is installed.

The LCD module of the present invention illustrated in FIG. 3 is suitably installed within flip type portable information terminals that open and shut along a horizontal axis as illustrated in FIG. 5. As shown in FIG. 5, the liquid crystal panel 41 may be positioned within the upper part of the portable information terminal and its display surface is exposed to the outside. The driving FPC film 48 and the main board 60 may be installed behind a keypad formed on the bottom inside of the portable information terminal.

Figure 6:
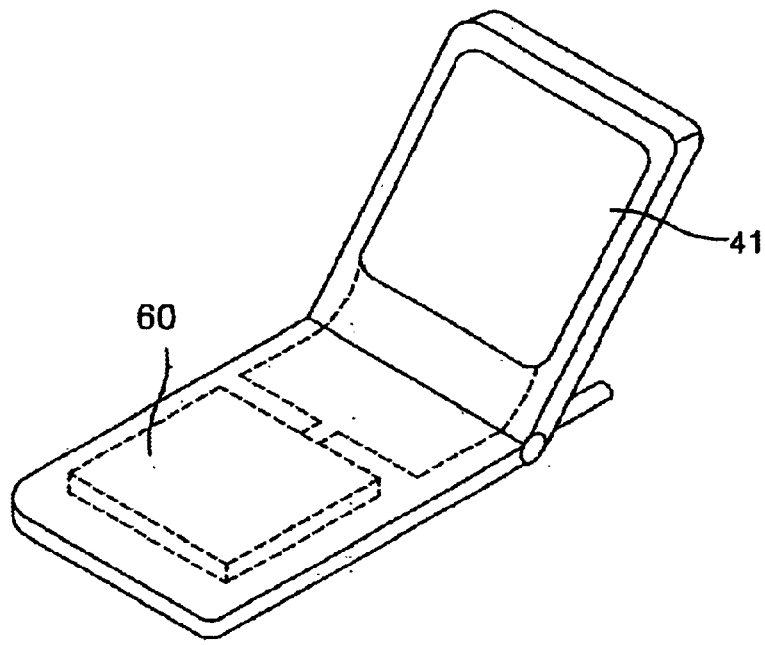
FIG. 6 illustrates a perspective view of a folder type portable information terminal where the LCD module shown in FIG. 3 is installed.

The LCD module according to the principles of the present invention and illustrated in FIG. 3 may also be installed within folder type portable information terminals that open and shut along a horizontal axis as illustrated in FIG. 6. As shown in FIG. 6, the hinge of the portable information terminal between the liquid crystal panel 41 and the main board 60 is located proximate to and overlaps the driving FPC film 48. The driving FPC film 48 does not affect the opening and shutting of the portable information terminal because it is a flexible film.

Figure 7:
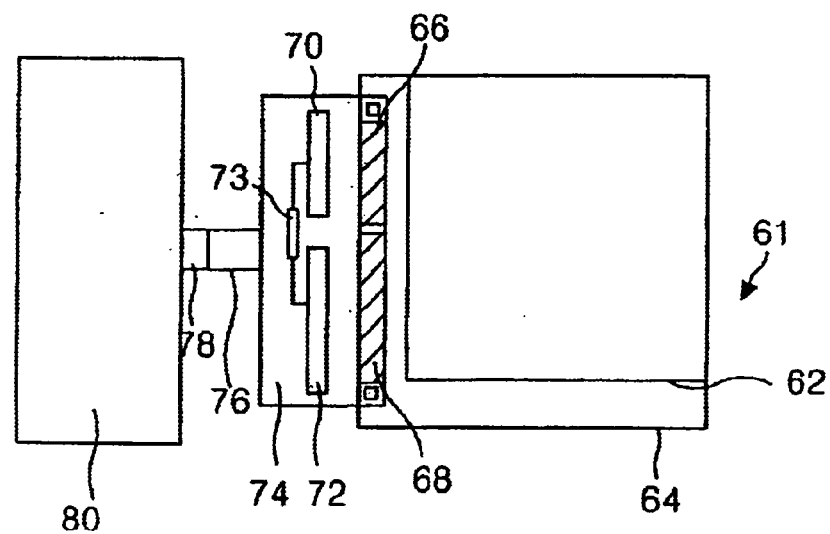
FIG. 7 illustrates an LCD module according to a second embodiment of the present invention.

FIG. 7 illustrates an LCD module of a portable information terminal according to a second embodiment of the present invention.

Referring to FIG. 7, an LCD module according to the present invention includes a liquid crystal panel 61, a group of gate pads 66 and a group of data pads 68 formed adjacent to each other at the side of the liquid crystal panel 61, gate and data driving ICs 70 and 72, respectively, are mounted on a driving FPC film 74, an FPC film 76 accommodating input/output wiring connects the driving FPC film 74 and a main board 80.

Figure 8:
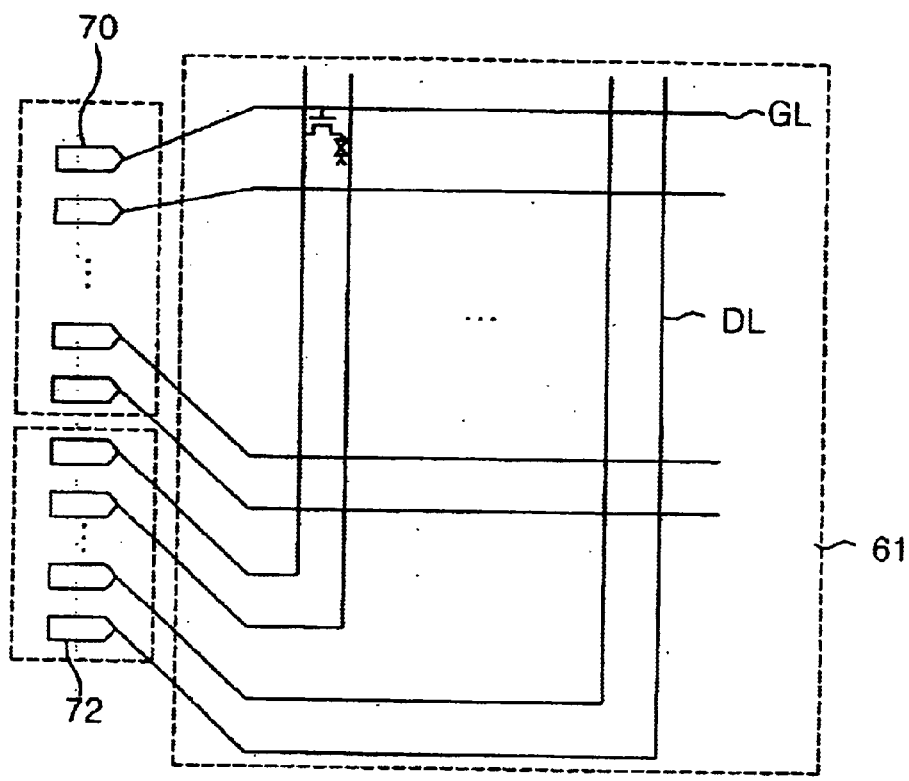
FIG. 8 illustrates a wiring arrangement connected to an electrode pad of the LCD as illustrated in FIG. 7.

In the liquid crystal panel 61, gate lines GL and data lines DL cross each other and liquid crystal cells are arranged in a matrix pattern at a pixel area between the crossing of the gate lines GL and data lines DL, as illustrated in FIG. 8. Lower substrate 64 and upper substrate 62 are joined together, followed by an injection of liquid crystal between the upper and lower substrates to complete fabrication of the liquid crystal panel 61.

As illustrated in FIG. 8, the gate pads 66 and data pads 68 are both formed at the edge of the left side of the liquid crystal panel 61, as two groups of pads having an equal pitch. Each pad within the group of gate pads 66 is located at the top left of the liquid crystal panel 61 and is connected to a single gate line GL as shown in FIG. 8. The gate pads 66 and data pads 68 may alternatively be both formed at the right side of the liquid crystal panel 61.

The gate pads 66, gate lines GL, and gate electrodes of a TFT (not shown) are formed by depositing a single metal layer on the lower substrate and performing a single photo etching patterning procedure, as shown in FIG. 8.

The group of data pads 68 is adjacent the group of gate pads 66, is located at the bottom of the left side of the liquid crystal panel 61, and each pad within the group of data pads 68 is connected to a single data line DL as shown in FIG. 8. The data pads 68, data lines DL, and source/drain electrodes of the TFT (not shown) are formed by depositing a single metal layer on the lower substrate and performing a single photo etching patterning, as shown in FIG. 8.

Referring back to FIG. 7, output pads of the driving FPC film 74 are connected to the gate pads 66 and data pads 68 by an ACF. Gate and data driving ICs 70 and 72, respectively, may be mounted on the driving FPC film 74 using a chip on film (COF) method.

The gate driving ICs 70 sequentially generate scanning signals (i.e., gate signals). The scanning signals are supplied to the gate lines GL via the output pad of the driving FPC film 74 and the gate pads 66. Accordingly, the liquid crystal panel 61 may be sequentially scanned by one line.

The data driving ICs 72 supply video data to the data lines DL one line at a time. Liquid crystal pixel cells connected to the line being scanned are charged with this video data.

A timing controller 73 may be mounted on the driving FPC film 74 for controlling the gate and data driving ICs 70 and 72, respectively. The timing controller supplies gate start pulses to each of the gate driving ICs 70 using a shift register (not shown) and simultaneously supplies red, green, and blue (RGB) data together with dot clocks to the data driving ICs 72.

The FPC film 76 accommodates input/output wiring and includes wirings through which signals may be transmitted thereby providing a signal transmission path between a main board 80 and the driving FPC film 74. A connector 78 may be installed at the end of the FPC film 76 and connects to a jack of the main board 80.

The main board 80 includes a microprocessor, a graphic processing circuit, etc., and supplies video signals and control signals to the driving FPC film 74 via the FPC film 76.

The gate and data pads 66 and 68, respectively, form two groups of adjacent pads connected to the driving FPC film 74 by a one time adhesion process. Thus, the number of TCPs (i.e., the number of FPC films used and the adhesion processes performed) are reduced in comparison with conventional LCD modules as shown in FIG. 1.

Figure 9:
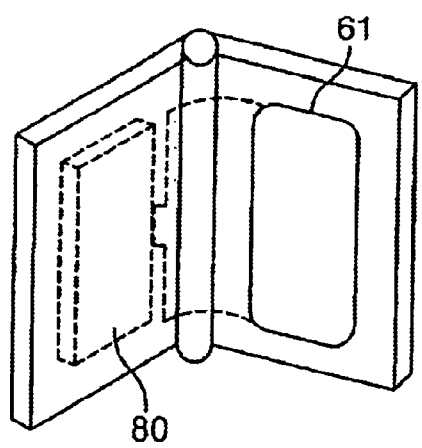
FIG. 9 illustrates a perspective view of a folder type portable information terminal where the LCD module shown in FIG. 7 is installed.

The LCD module of the present invention illustrated in FIG. 7 is suitably installed within folder type portable information terminals that open and shut along a vertical axis as illustrated in FIG. 9. As illustrated in FIG. 9, the hinge of the portable information terminal between the liquid crystal panel 61 and the main board 80 is located proximate to and overlaps with the driving FPC film 74. The driving FPC film 74 does not affect the opening and shutting driving of the portable information terminal because it is a flexible film.

As described above, portable information terminals having the LCD module described according to the present invention includes gate pads and data pads installed adjacent each other on a single side of the liquid crystal panel. The FPC film, on which the driving circuits are mounted by the chip on film method, is joined to the gate and data pads. As a result, in fabricating the liquid crystal module of a portable information terminal using the LCD module fabrication process of the present invention, the process of joining the FPC film to the gate and data pads is reduced to one time. Use of required components such as FPC, connectors, etc., is reduced. Since most driving circuits may be mounted on the FPC film by the chip on film method, the number of assembling processes is reduced. Accordingly, the fabrication method as described above yields LCD modules produced with increased productivity.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A portable information terminal having an LCD module, comprising:

a group of gate pads, wherein each gate pad within the group of gate pads is connected to a single gate line of a plurality of gate lines of a liquid crystal panel, and wherein the group of gate pads is formed at an edge of the liquid crystal panel; and a group of data pads, wherein each data pad within the group of data pads is connected to a single data line of a plurality of data lines of the liquid crystal panel, and wherein the group of data pads is formed at the edge of the liquid crystal panel adjacent the group of gate pads.

2. The portable information terminal according to claim 1, further comprising:
   a gate driving circuit for supplying scanning signals to the gate lines to drive the gate lines;
   a data driving circuit for supplying video data to the data lines to drive the data lines; and
   a flexible printed circuit film on which the gate driving circuit and the data driving circuit are mounted and to which the gate pads and the data pads are connected.

3. The portable information terminal according to claim 2, further comprising a timing controller mounted on the flexible printed circuit film for supplying data and timing control signals required by the gate and data driving circuits.

4. The portable information terminal according to claim 2, further comprising:
   a main board where circuits are mounted for supplying control signals and data to the flexible printed circuit film; and
   a connector installed at an end of the flexible printed circuit film and connecting to a jack of the main board.

5. The portable information terminal according to claim 1, wherein the gate and data pads have an equal pitch.

6. The portable information terminal according to claim 1, wherein the gate and data pads are formed at a bottom end of the liquid crystal panel.

7. The portable information terminal according to claim 1, wherein the gate and data pads are formed at a side end of the liquid crystal panel.

8. A method of fabricating a portable information terminal having an LCD module, comprising:
   providing a group of gate pads, wherein each gate pad within the group of gate pads is connected to a single gate line of a plurality of gate lines of a liquid crystal panel, and wherein the group of gate pads is formed at an edge of the liquid crystal panel; and
   providing a group of data pads, wherein each data pad within the group of data pads is connected to a single data line of a plurality of data lines of the liquid crystal panel, and wherein the group of data pads is formed at the edge of the liquid crystal panel adjacent the group of gate pads.

9. The method of fabricating a portable information terminal according to claim 8, further comprising:
   a gate driving circuit for supplying scanning signals to the gate lines to drive the gate lines;
   a data driving circuit for supplying video data to the data lines to drive the data lines; and
   a flexible printed circuit film on which the gate driving circuit and the data driving circuit are mounted and to which the gate pads and the data pads are connected.

10. The method of fabricating a portable information terminal according to claim 9, further comprising a timing controller mounted on the flexible printed circuit film for supplying data and timing control signals required by the gate and data driving circuits.

11. The method of fabricating a portable information terminal according to claim 9, further comprising:
   a main board where circuits are mounted for supplying control signals and data to the flexible printed circuit film; and
   a connector installed at an end of the flexible printed circuit film and connecting to a jack of the main board.

12. The method of fabricating a portable information terminal according to claim 8, wherein the gate and data pads have an equal pitch.

13. The method of fabricating a portable information terminal according to claim 8, wherein the gate and data pads are formed at a bottom end of the liquid crystal panel.

14. The method of fabricating a portable information terminal according to claim 8, wherein the gate and data pads are formed at a side end of the liquid crystal panel.

15. A portable information terminal having an LCD module, comprising:
   a liquid crystal panel, wherein the liquid crystal panel includes a plurality of gate lines and a plurality of data lines;
   a group of gate pads, wherein each gate pad within the group of gate pads is connected to a single gate line;
   a group of data pads, wherein each data pad within the group of data pads is connected to a single data line, and wherein the group of data pads is arranged adjacent the group of gate pads;
   a gate driving circuit;
   a data driving circuit; and
   a flexible printed circuit film, connecting the gate driving circuit to the group of gate pads and connecting the data driving circuit to the group of data pads.

16. The portable information terminal according to claim 15, further comprising:
   a main board for supplying video signals and control signals to the flexible printed circuit film,
   wherein the liquid crystal panel is located in a first portion of a portable information terminal, wherein the main board is located in a second portion of the portable information terminal, and wherein the first and second portions are hingedly connected to one another.

17. The portable information terminal according to claim 16, wherein the flexible printed circuit film spans the first and second portions.

18. The portable information terminal according to claim 15, wherein the group of gate pads and the group of data pads are arranged in a direction parallel to a major direction of the plurality of gate lines.

19. The portable information terminal according to claim 15, wherein the group of gate pads and the group of data pads are arranged in a direction parallel to a major direction of the plurality of data lines.

* * * * *